(12) United States Patent
Hamada et al.

(10) Patent No.: US 11,794,819 B2
(45) Date of Patent: Oct. 24, 2023

(54) IN-VEHICLE STRUCTURE OF ELECTRICAL EQUIPMENT

(71) Applicant: Mazda Motor Corporation, Hiroshima (JP)

(72) Inventors: Takashi Hamada, Aki-gun (JP); Kazuki Hirota, Aki-gun (JP); Satoshi Nakamura, Aki-gun (JP); Toshimitsu Yugami, Aki-gun (JP); Yoshiaki Noguchi, Aki-gun (JP); Koji Jahara, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 443 days.

(21) Appl. No.: 16/992,127

(22) Filed: Aug. 13, 2020

(65) Prior Publication Data

US 2021/0053624 A1 Feb. 25, 2021

(30) Foreign Application Priority Data

Aug. 23, 2019 (JP) .................................. 2019-153130

(51) Int. Cl.
*B62D 25/08* (2006.01)
*B60K 6/24* (2007.10)
(Continued)

(52) U.S. Cl.
CPC .............. *B62D 25/082* (2013.01); *B60K 6/24* (2013.01); *B60K 6/26* (2013.01); *B60K 6/28* (2013.01);
(Continued)

(58) Field of Classification Search
CPC .... B62D 25/082; B62D 21/15; B62D 21/152; B60K 6/24; B60K 6/26; B60K 6/28;
(Continued)

(56) References Cited

U.S. PATENT DOCUMENTS 6,460,642 B1 * 10/2002 Hirano ..................... B60K 6/40
903/952
7,610,973 B2 * 11/2009 Asao ........................ B60K 6/26
903/906
(Continued)

FOREIGN PATENT DOCUMENTS

EP 3483041 A1 5/2019
JP 2005-130545 A 5/2005

OTHER PUBLICATIONS

Extended European search report dated Dec. 23, 2020, in corresponding European patent Application No. 20189777.4, 9 pages.

*Primary Examiner* — James M Dolak
(74) *Attorney, Agent, or Firm* — XSENSUS LLP

(57) ABSTRACT

In an engine compartment, an engine, a generator using the engine as a power source, a motor for driving the vehicle, and a gear box are arranged in alignment in a vehicle width direction. The first high-voltage equipment is vertically provided on a generating unit that includes the engine and the generator. The second high-voltage equipment is vertically provided on a drive unit that includes the motor and the gear box. The first high-voltage equipment and the second high-voltage equipment are coupled by a coupling member that extends substantially horizontally in the vehicle width direction and supports the high-voltage equipment, against a falling load directed from one thereof toward the other.

19 Claims, 8 Drawing Sheets

(51) Int. Cl.
*B60K 6/26* (2007.10)
*B60K 6/28* (2007.10)
*B60R 16/02* (2006.01)
*B62D 21/15* (2006.01)

(52) U.S. Cl.
CPC .......... *B60R 16/0207* (2013.01); *B62D 21/15* (2013.01)

(58) Field of Classification Search
CPC ... B60K 6/00; B60K 6/20; B60K 1/00; B60K 5/00; B60R 16/00; B60R 16/0207; B60R 16/02; B60Y 2200/92; B60Y 2306/01; B60L 3/0007; B60L 50/61; B60L 53/22; B60L 53/20; B60L 53/00; B60L 2210/10
See application file for complete search history.

(56) References Cited

U.S. PATENT DOCUMENTS

| | | | | |
|---|---|---|---|---|
| 7,802,643 B2* | 9/2010 | Yajima | .................... | B60K 6/22 |
| | | | | 180/274 |
| 8,517,127 B2* | 8/2013 | Kanno | .................... | B60L 58/26 |
| | | | | 180/65.8 |
| 8,616,319 B2* | 12/2013 | Yokoyama | .......... | H01M 50/249 |
| | | | | 180/68.5 |
| 8,646,832 B2* | 2/2014 | Yamashita | .............. | B60R 19/18 |
| | | | | 296/203.02 |
| 8,698,347 B2* | 4/2014 | Ishigaki | .................. | B60L 50/16 |
| | | | | 307/10.7 |
| 8,820,452 B2* | 9/2014 | Iwasa | ...................... | B60L 50/51 |
| | | | | 307/10.6 |
| 9,016,415 B2* | 4/2015 | Kobayashi | ................ | B60L 3/00 |
| | | | | 123/41.27 |
| 9,101,060 B2* | 8/2015 | Yamanaka | ............... | B60K 1/00 |
| 9,108,502 B2* | 8/2015 | Yamanaka | ............... | B60K 6/40 |
| 9,199,537 B2* | 12/2015 | Hotta | ..................... | B60L 58/30 |
| 9,205,749 B2* | 12/2015 | Sakamoto | ........... | B60L 15/2009 |
| 9,254,871 B2* | 2/2016 | Hotta | ..................... | B60R 16/04 |
| 9,409,495 B2* | 8/2016 | Kobayashi | ............. | B60R 16/04 |
| 9,630,501 B2* | 4/2017 | Shiba | ...................... | B60K 6/48 |
| 9,827,971 B2* | 11/2017 | Suzuki | .................. | B60W 10/26 |
| 9,894,812 B2* | 2/2018 | Sakamoto | .......... | H05K 7/20872 |
| 10,093,249 B2* | 10/2018 | Ando | .................. | B60R 16/0239 |
| 10,381,902 B2* | 8/2019 | Fukushima | ............ | H02K 7/006 |
| 10,814,711 B2* | 10/2020 | Suumen | ................ | B62D 25/20 |
| 11,043,707 B2 | 6/2021 | Sloan | ................... | H01M 10/625 |
| 11,588,423 B2* | 2/2023 | Yamada | ................ | H02M 7/003 |
| 11,667,184 B2* | 6/2023 | Miyakawa | ............... | B60K 5/04 |
| | | | | 180/65.22 |

* cited by examiner

IN-VEHICLE STRUCTURE OF ELECTRICAL EQUIPMENT

CROSS REFERENCE TO RELATED APPLICATION

The present application claims priority to Japanese patent application JP 2019-153130, filed Aug. 23, 2019, the entire contents of which being incorporated herein by reference in its entirety.

TECHNICAL FIELD

The present disclosure relates to an in-vehicle structure of electrical equipment.

BACKGROUND ART

In Patent document 1, an in-vehicle structure of electrical equipment is described in which a fuel cell stack and a travel motor are arranged in alignment in a vehicle width direction in a front chamber that corresponds to an engine compartment in a front portion of a vehicle. In this in-vehicle structure, an inverter is supported on the travel motor, and a support bracket for the fuel cell stack and the inverter are coupled in the vehicle width direction by a bracket. The coupling bracket is inclined downward in the vehicle width direction from the inverter toward the support bracket.

PRIOR ART DOCUMENTS

Patent Documents

[Patent document 1] JP-A-2005-130545

SUMMARY OF THE DISCLOSURE

Problems to be Solved by the Disclosure

By the way, as recognized by the present inventor, it is desired that high-voltage equipment such as an inverter is not damaged during a collision of the vehicle so as not to electrically shock an occupant of the vehicle and the like. In the case of the in-vehicle structure described in Patent document 1, the coupling bracket is inclined downward (with reference to a plane that is between, vehicle and co-planar with, a roof of the c and the road) in the vehicle width direction from the inverter toward the support bracket for the fuel cell stack. Accordingly, the coupling bracket hardly fulfills a support function to adequately support the inverter with the fuel cell stack when the inverter is subjected to a falling load to the fuel cell stack.

The present disclosure prevents destruction of high-voltage equipment such as an inverter during a collision of a vehicle.

Means for Solving the Above-Identified and Other Problems

In order to solve the above-identified and other problems, the present disclosure suppresses the falling of high-voltage equipment by using the support of another high-voltage equipment.

An in-vehicle structure disposed in an engine compartment in a front portion of a vehicle, the in-vehicle structure includes a power generator that includes an engine and a generator that uses the engine as a power source;
a drive system having a motor that supplies drive power to the vehicle;
first high-voltage equipment;
second high-voltage equipment; and
a mechanical coupler that couples the first high-voltage equipment to the second high-voltage equipment, wherein
the power generator and the drive system are arranged in alignment in a vehicle width direction in the engine compartment,
the first high-voltage equipment is vertically provided on one of the power generator and the drive system,
the second high-voltage equipment is vertically provided on the other of the power generator and the drive system, and
the mechanical coupler extends substantially horizontally in the vehicle width direction, and supports the first high-voltage equipment and second high-voltage equipment against a falling load imposed on one or both of the first high-voltage equipment and second high-voltage equipment as a result of a vehicle collision.

According to this in-vehicle structure, even when the falling load is applied to one of the first and second high-voltage equipment during an offset frontal collision or a lateral collision of the vehicle, such a load is received by the other high-voltage equipment via the coupling member that extends substantially horizontally in the vehicle width direction. Therefore, destruction of the high-voltage equipment is prevented.

In one embodiment, the first high-voltage equipment is electrical equipment for charging a battery with the generator, and the second high-voltage equipment is electrical equipment for controlling driving of the motor by the battery.

In one embodiment, a high-voltage harness is provided to connect the first high-voltage equipment and the second high-voltage equipment, and an upper side of this high-voltage harness is covered with the coupling member. Thus, the coupling member prevents application of a load to the high-voltage harness from above. That is, the coupling member has both of a function to prevent falling of the high-voltage equipment and a function to prevent damage to the high-voltage harness. This is advantageous for a reduction in the number of components.

In one embodiment, a front end of one of the first high-voltage equipment and the second high-voltage equipment sticks out to a front side of the vehicle in comparison with a front end of the other, a longitudinal width of the coupling member is gradually increased from the other high-voltage equipment toward the high-voltage equipment, and a front edge thereof is inclined to the front of the vehicle from the other high-voltage equipment toward the high-voltage equipment.

The front end of the high-voltage equipment sticks out more than that of the other high-voltage equipment. Accordingly, in the case of the offset frontal collision from this high-voltage equipment side, the high-voltage equipment is applied with the falling load that is directed obliquely rearward. Meanwhile, in the embodiment, the front edge of the coupling member is inclined to the front of the vehicle from the other high-voltage equipment toward the high-voltage equipment, in other words, extends obliquely rearward from the high-voltage equipment toward the other high-voltage equipment. Thus, the falling load in the oblique direction is reliably transmitted from the high-voltage equipment to the other high-voltage equipment. Therefore, this is advantageous for suppressing falling of the high-voltage equipment that is applied with a collision load.

In one embodiment, one of the first high-voltage equipment and the second high-voltage equipment is elastically supported on the generating unit or on the drive unit such that inclination thereof to the other high-voltage equipment side is allowed.

According to this, when one of the first high-voltage equipment and the second high-voltage equipment is inclined to the other, the above elastic support avoids application of a large bending force to the high-voltage equipment, in particular, concentration of a load to a base of the high-voltage equipment. Therefore, this is advantageous for preventing damage to the high-voltage equipment.

In one embodiment, the coupling member includes an elastic receiving section that elastically receives one of the first high-voltage equipment and the second high-voltage equipment at the time when the high-voltage equipment is inclined to the other high-voltage equipment side.

According to this, a shock is absorbed when one of the first high-voltage equipment and the second high-voltage equipment is elastically received by the elastic receiving section of the coupling member during the collision of the vehicle. Therefore, this is advantageous for preventing the damage to the first high-voltage equipment and the second high-voltage equipment. In other words, the coupling member has the elastic receiving section. Thus, when being applied with the falling load, the high-voltage equipment does not serve as a complete strutting member. Therefore, for example, impulsive concentration of stress to fastened section between the coupling member and each of the high-voltage equipment is avoided, which avoids breakage of the fastened section and impairment of a load transmission function of the coupling member. This is advantageous for preventing the damage to the high-voltage equipment.

In one embodiment, the coupling member has a U-shaped cross-sectional shape in a longitudinal direction of the vehicle. As a result, the coupling member is unlikely to buckle due to a large section modulus, which is advantageous for receiving the falling load between both of the high-voltage equipment.

In one embodiment, heights of upper ends of the first high-voltage equipment and the second high-voltage equipment substantially match each other, and the coupling member couples upper end portions of the first high-voltage equipment and the second high-voltage equipment. In this way, the falling load is easily received between both of the high-voltage equipment.

Advantages of the Disclosure

According to the present disclosure, in the engine compartment in the front portion of the vehicle, the generating unit and the drive unit are arranged in alignment in the vehicle width direction, the first high-voltage equipment is vertically provided on one of these units, the second high-voltage equipment is vertically provided on the other, and the coupling member is provided to couple both of these high-voltage equipment, extend substantially horizontally in the vehicle width direction, and provide support against the falling load between both of the high-voltage equipment, the falling load being directed to the other high-voltage equipment. Thus, even when the falling load is applied to the high-voltage equipment due to the collision of the vehicle, the load is supported by the other high-voltage equipment via the coupling member, and thus falling of the high-voltage equipment is prevented.

DETAILED DESCRIPTION

A description will hereinafter be made with reference to the drawings. The following description on a preferred embodiment is essentially and merely illustrative and thus has no intention to limit the present disclosure, application subjects thereof, and application thereof.

<Overall Configuration of in-Vehicle Structure of Electrical Equipment>

Figure 1:
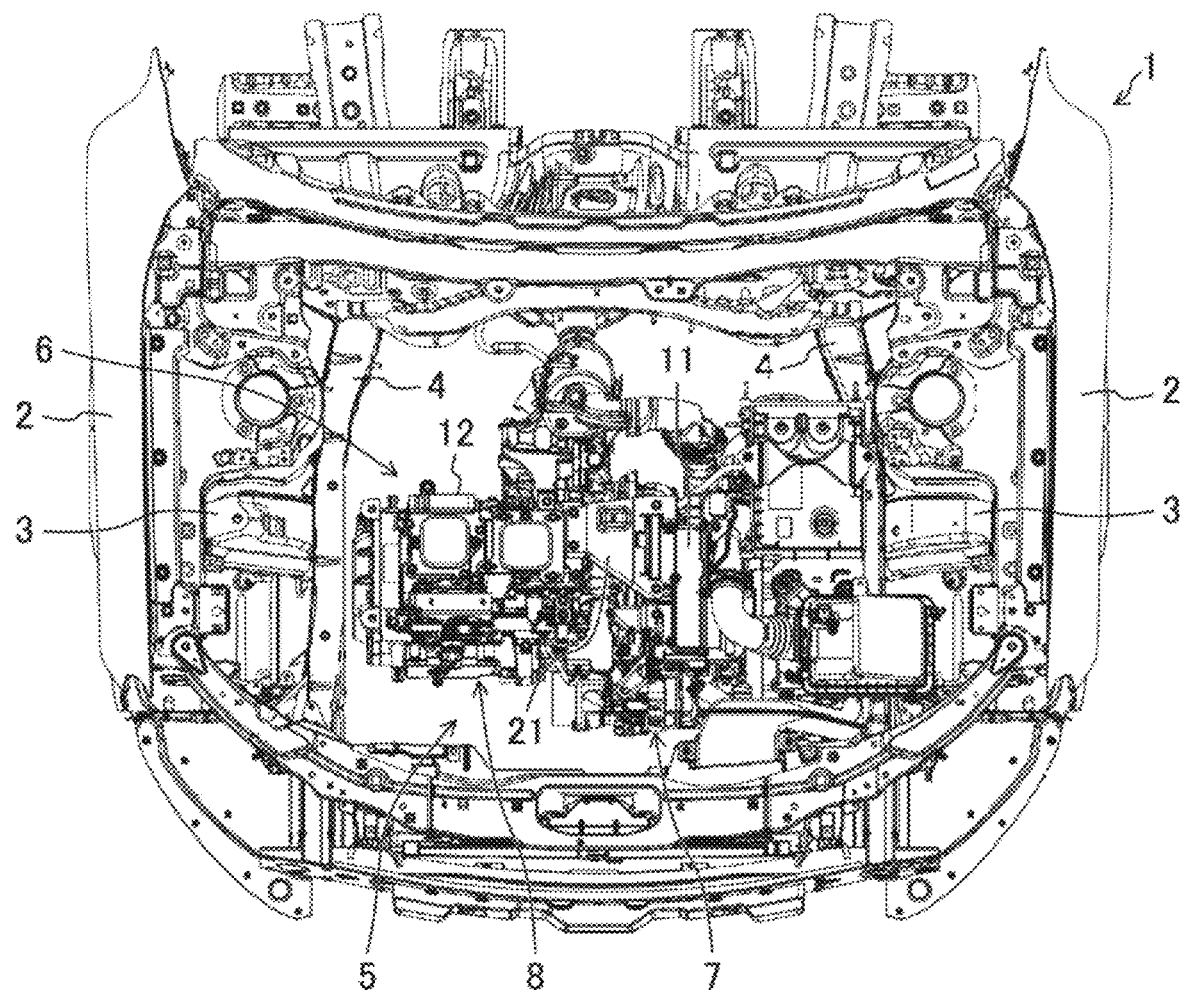
FIG. 1 is a plan view illustrating an engine compartment in a front portion of a vehicle.

In a front portion of a vehicle 1 illustrated in FIG. 1, a vehicle fender is denoted by 2, a wheel apron is denoted by 3, and a side frame that extends in a vehicle longitudinal direction on an inner side of the wheel apron 3 is denoted by 4. An engine compartment 5 is formed between the right and left side frames 4. A generator/drive unit (also referred to herein as power generator, or power generation machinery such as an internal combustion engine and/or electric motor) 6 for powering the vehicle 1 is accommodated in the engine compartment 5.

The generator/drive unit 6 includes a generating unit 7, a drive unit 8 for the vehicle 1, first high-voltage equipment 11, and second high-voltage equipment 12. In this context, "high-voltage" is a voltage level higher than 12 VDC, such as boosted voltage of 48V through 72V such as that used in an induction engine. It may include AC and/or DC voltages. The generator/drive unit 6 is supported by the right and left side frames 4 and a suspension crossmember (not illustrated) that is suspended between both of these side frames 4. The generating unit 7 and the drive unit 8 are arranged in alignment in a vehicle width direction. Although not illustrated, a battery that is charged by the generating unit 7 is arranged under a cabin floor of the vehicle 1.

<Basic Configuration of Each Component in in-Vehicle Structure of Electrical Equipment>

Figure 2:
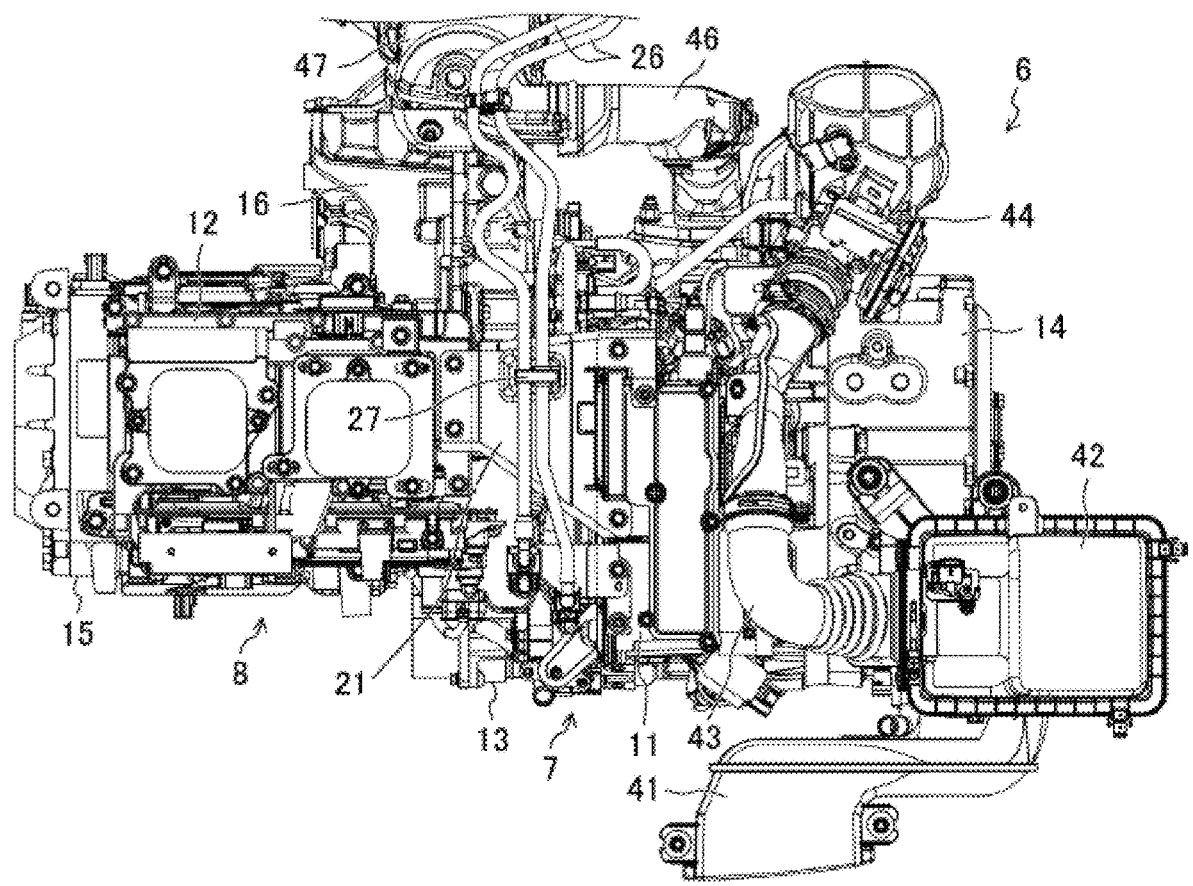
FIG. 2 is a plan view of a generator/drive unit.

FIG. 2 is a front view in which the generator/drive unit 6 is seen from the front of the vehicle. The generating unit 7 and the drive unit 8 are arranged such that the former is positioned on a vehicle left side and the latter is positioned on a vehicle right side.

The generating unit 7 includes an engine 13 and a generator 14 that uses the engine 13 as a power source. The engine 13 in this example is a rotary engine. An eccentric shaft of the engine 13 is arranged in the vehicle width direction. The generator 14 in this example is an AC generator, and a rotor thereof is rotationally driven by the eccentric shaft of the engine 13. The engine 13 and the generator 14 are arranged in alignment in the vehicle width direction such that the former is positioned relatively on the vehicle right side and the latter is positioned relatively on the vehicle left side, and both of them are joined to each other.

The drive unit 8 (or drive system) includes: a motor 15 for driving the vehicle 1; and a gear box 16 that constitutes a reduction drive. The motor 15 in this example is a three-phase AC motor. The motor 15 and the gear box 16 are arranged in alignment in the vehicle width direction such that the former is positioned relatively on the vehicle right side and the latter is positioned relatively on the vehicle left side, and both of them are joined to each other.

Accordingly, in the engine compartment 5, four components of the motor 15, the gear box 16, the engine 13, and the generator 14 are sequentially aligned in the vehicle width direction from the vehicle right side. The engine 13 and the gear box 16 are joined to each other. The alignment direction of the four components can appropriately be changed, such that the alignment of components shown in FIG. 4 would label elements 15, 16, 13, and 14 for the generator, engine, gear box and motor respectively.

Figure 3:
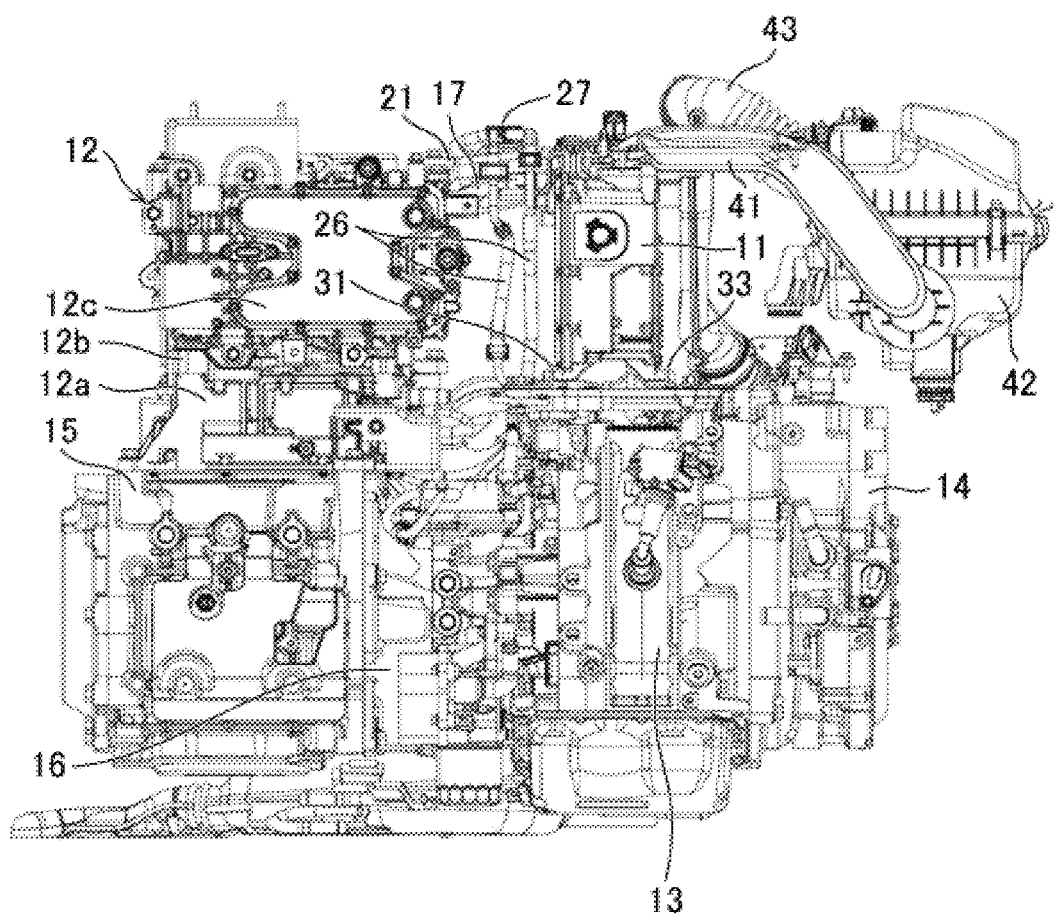
FIG. 3 is a front view of the generator/drive unit.

The first high-voltage equipment 11 is a converter that converts AC power generated by the generator 14 into DC power so as to store the DC power in the battery, and a circuit part (e.g., one or more circuits, or more generally "circuitry") thereof that is used to generate the DC power from an AC power supply is accommodated in a housing made of an aluminum alloy. As illustrated in FIG. 3, the first high-voltage equipment 11 in this example is vertically provided on the engine 13.

The second high-voltage equipment 12 is electrical equipment for primarily controlling driving of the motor 15 by the battery. The second high-voltage equipment 12 includes an inverter 12*a*, a junction box 12*b*, and a DC/DC converter 12*c* and is vertically provided on the motor 15. More specifically, the inverter 12*a* is placed on the motor 15 and is joined to the motor 15. The junction box 12*b* is placed on the inverter 12*a*, and the inverter 12*a* is joined to the junction box 12*b*. The DC/DC converter 12*c* is fixed to a front surface of the junction box 12*b*.

The inverter 12*a* boosts a voltage that is applied from the battery under the floor via a power supply cable, and outputs the boosted voltage. A circuit part thereof that is used to convert the DC power into three-phase AC power is accommodated in a housing made of the aluminum alloy. Switching circuitry of the junction box 12*b* including a terminal and a relay that electrically connect/disconnect the battery and the inverter 12*a*, and the like are accommodated in a housing made of the aluminum alloy. The DC/DC converter 12*c* is a converter that converts a high voltage into a low voltage (for example, 12 V) for driving the in-vehicle equipment.

As described above, the first high-voltage equipment 11 is vertically provided on the engine 13, and the second high-voltage equipment 12 is vertically provided on the motor 15 that is separated from the engine 13 in the vehicle width direction. "Vertically provided" in this context means that the equipment is vertically oriented and has a main face that is longer than a side face, and the main face extends in the vertical direction. Thus, the first high-voltage equipment 11 and the second high-voltage equipment 12 are separated from each other in the vehicle width direction. The first high-voltage equipment 11 and the junction box 12*b* of the second high-voltage equipment 12 are connected by a high-voltage harness 17.

In FIG. 2 and FIG. 3, an intake duct of the engine 13 is denoted by 41, an air cleaner to which the intake duct 41 is connected is denoted by 42, an intake pipe that extends from the air cleaner 42 toward an intake port of the engine 13 is denoted by 43, and a throttle body is denoted by 44. An exhaust pipe of the engine 13 is denoted by 46, and a catalytic converter is denoted by 47.

<Regarding a Falling-Over of High-Voltage Equipment During Collision of Vehicle>

Figure 4:
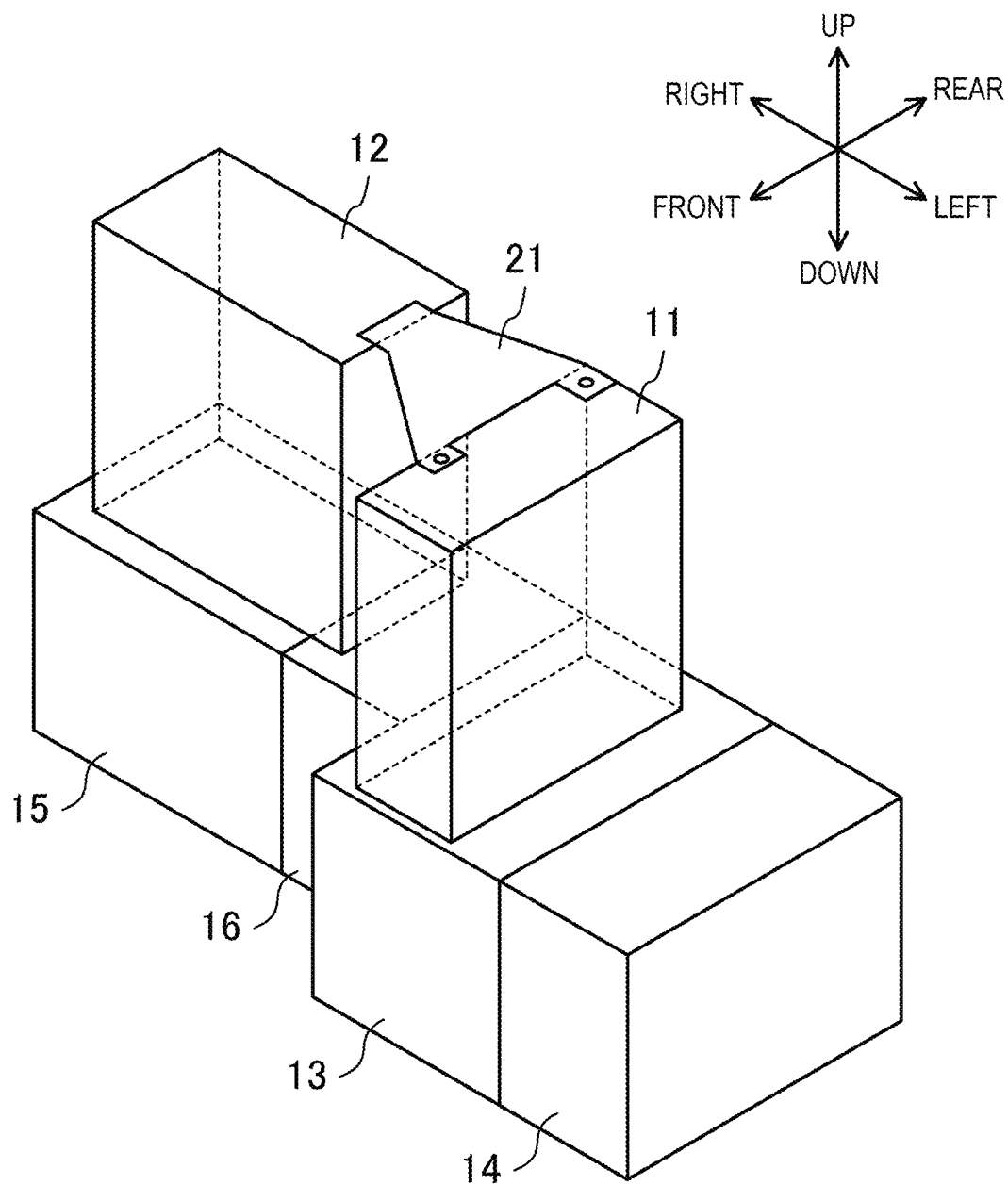
FIG. 4 is a perspective view schematically illustrating the generator/drive unit.

As schematically illustrated in FIG. 4, the first high-voltage equipment 11 has a substantially rectangular parallelepiped shape that is elongated in the vehicle longitudinal direction. Main faces of the rectangular parallelepiped shape are on the right and left side of the first high-voltage equipment 11 and have larger surface areas than the four side faces of the rectangular parallelepiped shape. Thus, as shown, the first high-voltage equipment 11 is vertically provided (or vertically oriented) because the main faces extend in the vertical (up-down) direction. Thus, if unsupported, the first high-voltage equipment 11 would have a tendency to tip-over if subjected to a mechanical shock (e.g., a sideways force). The second high-voltage equipment 12 has a rectangular parallelepiped shape that is elongated in the vehicle width direction (a right-left direction), and is also vertically oriented. The first high-voltage equipment 11 and the second high-voltage equipment 12 are substantially at a same height. In addition, as described above, the first high-voltage equipment 11 and the second high-voltage equipment 12 are separated from each other in the vehicle width direction. Furthermore, a front end of the first high-voltage equipment 11 is located on a vehicle front side in comparison with a front end of the second high-voltage equipment 12. That is, the front end of the first high-voltage equipment 11 sticks out to the vehicle front side in comparison with the front end of the second high-voltage equipment 12.

In this case, as recognized by the present inventor, when an offset frontal collision or a lateral collision of the vehicle 1 occurs, a load in a laterally falling direction is applied to one of the first high-voltage equipment 11 and the second high-voltage equipment 12. That is, in the offset frontal collision or the lateral collision from the left side, the first high-voltage equipment 11 has a load (force) applied thereto that causes the first high-voltage equipment 11 to tend to fall (or tip) toward the second high-voltage equipment 12. In the offset frontal collision or the lateral collision from the right side, the second high-voltage equipment 12 has the load (force) applied thereto that causes the second high-voltage equipment 12 to tend to fall (or tip) toward the first high-voltage equipment 11. In particular, in the case of the embodiment, due to the substantially rectangular parallelepiped shape that is elongated in the vehicle longitudinal direction, with the main faces vertically oriented, the first high-voltage equipment 11 easily falls (or tips) to the second high-voltage equipment 12 side. Furthermore, since the front end of the first high-voltage equipment 11 sticks out further to the vehicle front side in comparison with the front end of the second high-voltage equipment 12, the first high-voltage equipment 11 is more likely to receive a sufficiently strong collision load generated by the offset frontal collision from the left side to cause it to tip over, if not adequately supported.

<Measure Against Falling of High-Voltage Equipment and the Like>

As illustrated in FIG. 2, the first high-voltage equipment 11 and the second high-voltage equipment 12 are coupled by a coupling member 21 for support against the falling load.

As illustrated in FIG. 3 and FIG. 4, the coupling member 21 couples an upper end portion of the first high-voltage equipment 11 and an upper end portion of the second high-voltage equipment 12, and extends substantially horizontally in the vehicle width direction.

Figure 5:
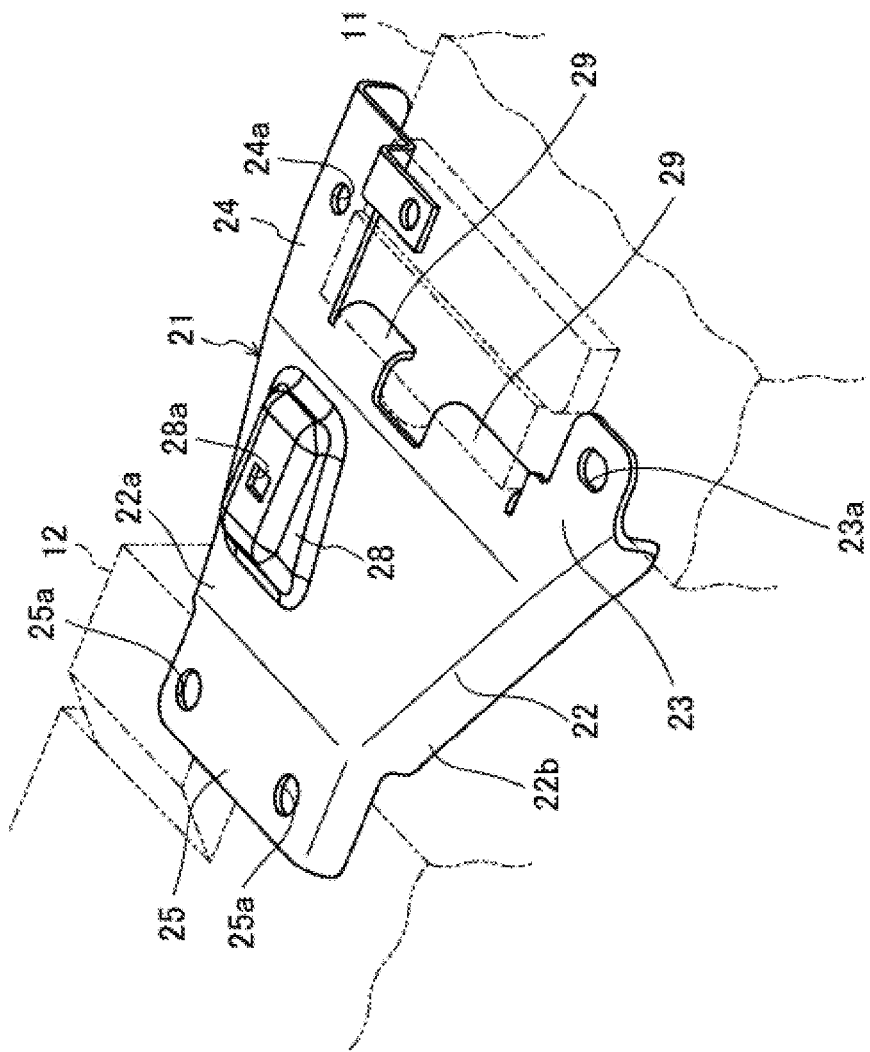
FIG. 5 is a perspective view illustrating a coupling member (also referred herein as "mechanical coupler") that couples first high-voltage equipment and second high-voltage equipment.
Figure 6:
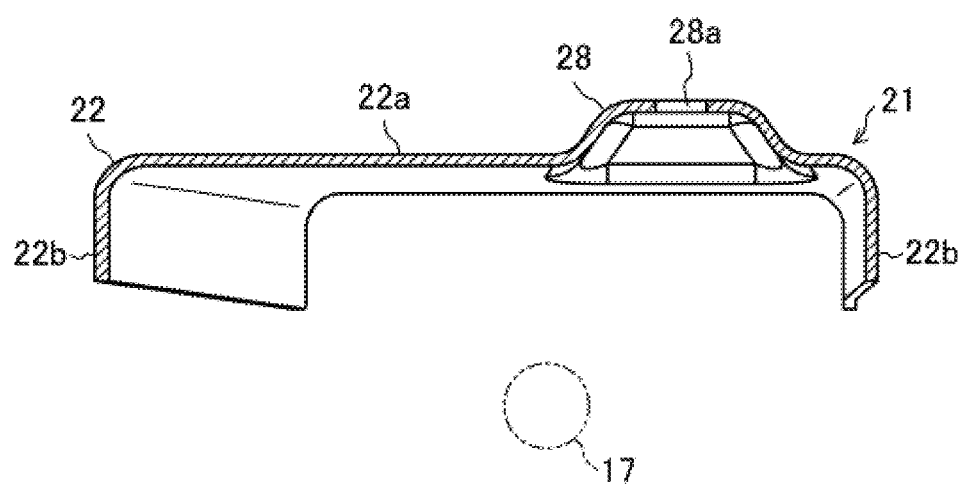
FIG. 6 is a cross-sectional view of the same coupling member.

As illustrated in FIG. 5 and FIG. 6, the coupling member 21 is formed of a plate material and includes: a base plate section 22; first attachment sections 23, 24, each of which extends from the base plate section 22 to the first high-voltage equipment 11 side; and a second attachment section 25 that extends from the base plate section 22 to the second high-voltage equipment 12 side.

Figure 7:
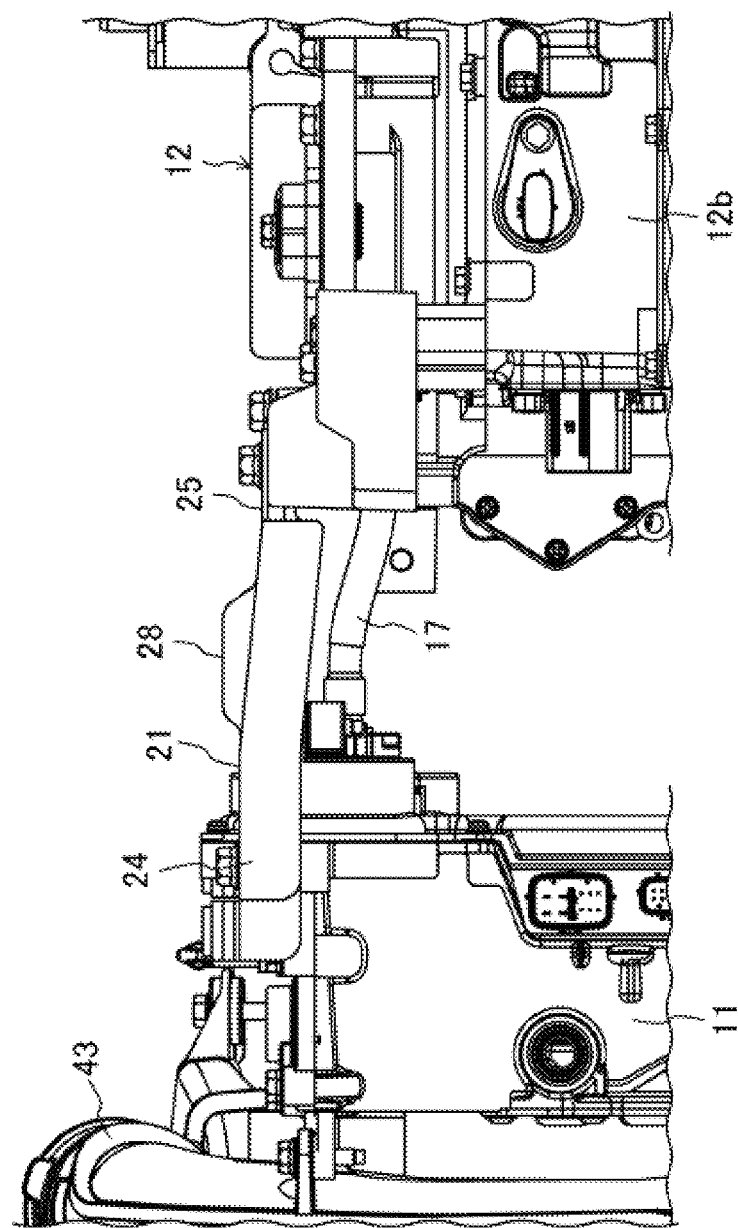
FIG. 7 is a view in which the first high-voltage equipment, the second high-voltage equipment, and the coupling member are seen from a vehicle rear side.

The base plate section 22 has: a web 22a that expands substantially horizontally; and a flange 22b that is projected downward from each of front and rear edges of the web 22, and has a substantially U-shaped cross section (a cross section that is cut in the vehicle longitudinal direction). The web 22a is formed with a fuel pipe attachment section 28 that bulges upward and has an attachment hole 28a used to attach a clip 27 for holding a fuel pipe 26 of the engine 13 illustrated in FIG. 2. In addition, as illustrated in FIG. 6 and FIG. 7, the coupling member 21 is arranged in a manner to cover the high-voltage harness 17 from above with the base plate section 22.

The first attachment sections 23, 24 extend from the base plate section 22 to the first high-voltage equipment 11 side with a clearance being interposed therebetween in the longitudinal direction. Each of the first attachment sections 23, 24 includes: a lateral plate section that continues from the web 22a; and a vertical plate section that continues from the flange 22b, and is formed to have an L-shaped cross section. The lateral plate sections of the first attachment sections 23, 24 are respectively formed with attachment holes 23a, 24a, each of which is used to join the lateral plate section to an upper surface of the first high-voltage equipment 11 by a bolt.

The second attachment section 25 extends from the web 22a to the second high-voltage equipment 12 side. Each of front and rear portions of the second attachment section 25 is formed with an attachment hole 25a that is used to join the second attachment section 25 to an upper surface of the second high-voltage equipment 12 by a bolt.

A longitudinal width of the base plate section 22 is gradually increased from the second high-voltage equipment 12 toward the first high-voltage equipment 11, and a front edge of the coupling member 21 (the flange 22b of the base plate section 22 and the vertical plate section of the first attachment section 23 that continues therefrom) is inclined to the front of the vehicle 1 from the second high-voltage equipment 12 toward first high-voltage equipment 11.

An elastic receiving section 29 is formed between the first attachment sections 23, 24 of the coupling member 21. The elastic receiving section 29 continues from the web 22a, is bent downward, and has an elastic property such that it elastically receives the first high-voltage equipment 11 at the time when the first high-voltage equipment 11 is inclined to the second high-voltage equipment 12 side. More specifically, in regard to fastening between the first high-voltage equipment 11 and the coupling member 21, a clearance is provided between the fastening bolt and an inner circumferential surface of each of the attachment holes 23a, 24a from a perspective of an ability to assemble the components. Meanwhile, the elastic receiving section 29 of the coupling member 21 is in elastic contact with the first high-voltage equipment 11. Accordingly, when the first high-voltage equipment 11 falls to the second high-voltage equipment 12 side, the above clearance for the fastening bolt is elastically received by the elastic receiving section 29 of the coupling member 21.

Figure 8:
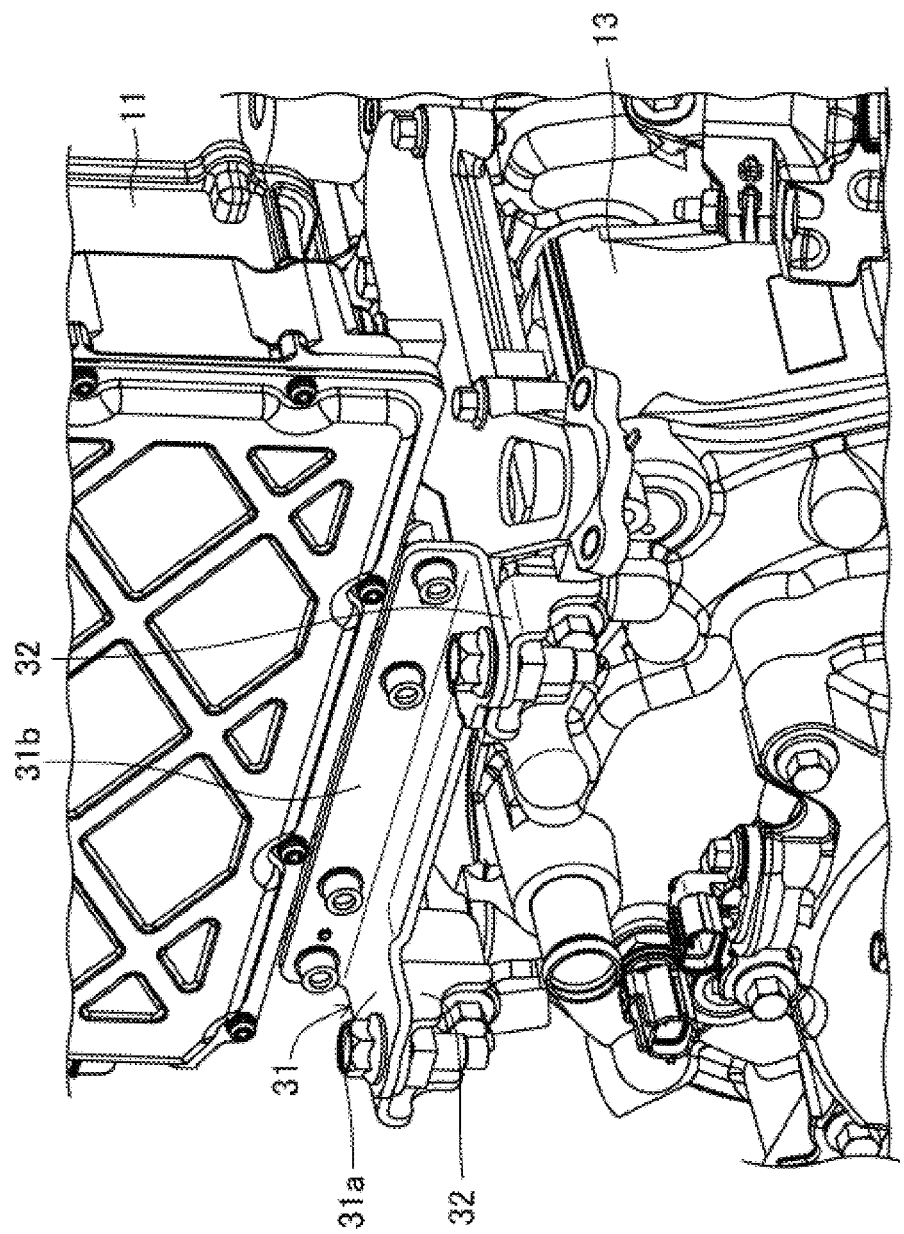
FIG. 8 is a perspective view illustrating a support structure of the first high-voltage equipment on an engine.

As illustrated in FIG. 8, a lower end portion on the second high-voltage equipment 12 side of the first high-voltage equipment 11 is elastically supported on the engine 13 via an L-shaped bracket (an elastic support member) 31 that includes a lateral plate section 31a and a vertical plate section 31b. More specifically, the bracket 31 is made of iron, and the lateral plate section 31a and the vertical plate section 31b extend in the vehicle longitudinal direction. Both end portions of the lateral plate section 31a are vertically fastened by bolts to attachment sections 32 at two positions that are provided to the engine 13 with a clearance being provided therebetween in the longitudinal direction. The vertical plate section 31b is fastened in the vehicle width direction by bolts to plural positions in a lower end portion of the housing for the first high-voltage equipment 11, and a clearance is provided between two each of the plural positions in the longitudinal direction.

When the first high-voltage equipment 11 is inclined to the second high-voltage equipment 12 side, an angle defined by the lateral plate section 31a and the vertical plate section 31b of the bracket 31 is changed, and the vertical plate section 31b thereby elastically falls with respect to the lateral plate section 31a. That is, the first high-voltage equipment 11 is elastically supported on the engine 13 by the bracket 31 such that the inclination thereof to the second high-voltage equipment 12 is allowed.

As illustrated in FIG. 3, a lower end portion of the first high-voltage equipment 11 on an opposite side from the second high-voltage equipment 12 side is also elastically supported on the engine 13 by a similar L-shaped bracket (an elastic support member) 33 to that on the second high-voltage equipment such that the inclination of the first high-voltage equipment 11 to the second high-voltage equipment 12 side is allowed.

As it has been described so far, when the first high-voltage equipment 11 is applied with the falling load that causes the first high-voltage equipment 11 to fall to the second high-voltage equipment 12 side due to the collision of the vehicle 1, the second high-voltage equipment 12 receives the falling load via the coupling member 21. The coupling member 21 couples the upper end portions of the first high-voltage equipment 11 and the second high-voltage equipment 12 and is provided substantially horizontally in the vehicle width direction. Thus, the falling load that is applied to the first high-voltage equipment 11 is reliably received by the second high-voltage equipment 12 via the coupling member 21. As a result, falling of the first high-voltage equipment 11 is prevented.

The coupling member 21 has a U-shaped cross section in the vehicle longitudinal direction, and a section modulus thereof is increased. In addition, when falling toward the second high-voltage equipment 12, the first high-voltage equipment 11 is elastically received by the elastic receiving section 29 of the coupling member 21. Accordingly, even when the first high-voltage equipment 11 is impulsively subjected to the load, deformation such as buckling of the coupling member 21 and damage to bolt fastening sections are unlikely to occur. Therefore, the second high-voltage equipment 12 reliably receives the falling load of the first high-voltage equipment 11.

In addition, the front end of the first high-voltage equipment 11 sticks out to the vehicle front side in comparison with that of the second high-voltage equipment 12. Accordingly, during the left offset frontal collision, the falling load is applied obliquely rearward from the first high-voltage equipment 11 to the second high-voltage equipment 12. Meanwhile, the base plate section 22 of the coupling member 21 is gradually widened from the second high-voltage equipment 12 toward the first high-voltage equipment 11, and the front edge thereof is inclined to the front of the vehicle 1 toward first high-voltage equipment 11. Accordingly, with such inclination of the base plate section 22, even in the case of the falling load of the first high-voltage equipment 11 that is generated by the left offset frontal collision and is directed obliquely rearward, such a falling load is reliably transmitted to the second high-voltage equipment 12 by the coupling member 21.

When a lateral falling load is applied to the first high-voltage equipment 11 during the collision of the vehicle, stress is likely to be concentrated on abase side of the first high-voltage equipment 11 that is fastened to the engine 13. To handle this, in this embodiment, the first high-voltage equipment 11 is elastically supported on the engine 13 by the L-shaped bracket 31. Thus, the damage to the first high-voltage equipment 11 from the base thereof is avoided.

What has been described so far is the case where the first high-voltage equipment 11 is applied with the falling load to the second high-voltage equipment 12 side due to the collision of the vehicle 1. To handle this, also when the second high-voltage equipment 12 is applied with the falling load to the first high-voltage equipment 11 side due to the collision of the vehicle 1, the first high-voltage equipment 11 receives the falling load via the coupling member 21. As a result, destruction of the second high-voltage equipment 12 is prevented. Moreover, owing to a generally orthogonal and vertical orientation of the main faces of the first high-voltage equipment 11 with respect to the second high-voltage equipment 12, along with the coupling member being connected to and supported of the top surfaces of the first high-voltage equipment 11 and the second high-voltage equipment 12, the combined arrangement provides excellent symbiotic, mechanical support to prevent the first high-voltage equipment 11 and/or the second high-voltage equipment 12 from toppling over in during a vehicle collision, regardless of collision angle.

In addition, in the above embodiment, the coupling member 21 prevents the application of the load to the high-voltage harness 17 from above during the collision of the vehicle 1 and the like, which is advantageous for protection of the high-voltage harness 17. Furthermore, the highly rigid coupling member 21 includes the fuel pipe attachment section 28 for holding the fuel pipe 26, which is advantageous for protection of the fuel pipe 26 during the collision of the vehicle and the like and is also advantageous for a reduction in the number of components for arranging the fuel pipe 26.

The above embodiment is the case where the first high-voltage equipment 11 sticks out to the vehicle front side in comparison with the second high-voltage equipment 12. Meanwhile, in a case where the second high-voltage equipment 12 sticks out to the vehicle front side in comparison with the first high-voltage equipment 11, the coupling member 21 only needs to have the longitudinal width that is gradually increased from the first high-voltage equipment 11 toward the second high-voltage equipment 12, and the front edge thereof only needs to be inclined to the front of the vehicle from the first high-voltage equipment 11 toward the second high-voltage equipment 12.

In addition, the coupling member 21 can also be configured to include an elastic receiving section that elastically receives the second high-voltage equipment 12 at the time when the second high-voltage equipment 12 is inclined to the first high-voltage equipment 11 side.

Furthermore, the second high-voltage equipment 12 may elastically be supported on the drive unit 8 such that the inclination thereof to the first high-voltage equipment 11 side is allowed.

DESCRIPTION OF REFERENCE SIGNS AND NUMERALS

1: Vehicle
5: Engine compartment
6: Generator/drive unit (powertrain)
7: Generating unit
8: Drive unit
11: First high-voltage equipment
12: Second high-voltage equipment
13: Engine
14: Generator
15: Motor
16: Gear box
17: High-voltage harness
21: Coupling member
29: Elastic receiving section
31: Bracket (elastic support member)
33: Bracket (elastic support member)

The invention claimed is:

1. An in-vehicle structure disposed in an engine compartment in a front portion of a vehicle, the in-vehicle structure comprising:
a power generator that includes an engine and a generator that uses the engine as a power source;
a drive system having a motor that supplies drive power to the vehicle;
first high-voltage equipment;
second high-voltage equipment; and
a mechanical coupler including a longitudinal plate that spans a gap between the first high-voltage equipment and the second high-voltage equipment, the mechanical coupler couples a top of the first high-voltage equipment to a top of the second high-voltage equipment, wherein
the power generator and the drive system are arranged in alignment in a vehicle width direction in the engine compartment,
the first high-voltage equipment is vertically provided on one of the power generator and the drive system, wherein vertically provided for equipment means a main face of the equipment is longer than a side face of the equipment, and the main face extends in a vertical direction,
the second high-voltage equipment is vertically provided on the power generator under a condition the first high-voltage equipment is vertically provided on the drive system, and second high-voltage equipment is vertically provided on the drive system under a condition the first high-voltage equipment is vertically provided on the power generator, and
the mechanical coupler extends horizontally in the vehicle width direction, and supports the first high-voltage equipment and the second high-voltage equipment against a falling load imposed on at least one of the first high-voltage equipment and the second high-voltage equipment as a result of a vehicle collision.

2. The in-vehicle structure according to claim 1, wherein the first high-voltage equipment is electrical equipment configured to charge a battery via the generator, and the second high-voltage equipment is electrical equipment configured to control a drive operation of the motor by the battery.

3. The in-vehicle structure according to claim 1 further comprising:
a high-voltage harness that connects the first high-voltage equipment and the second high-voltage equipment, wherein
an upper side of the high-voltage harness is covered with the mechanical coupler.

4. The in-vehicle structure according to claim 2 further comprising:
a high-voltage harness that connects the first high-voltage equipment and the second high-voltage equipment, wherein
an upper side of the high-voltage harness is covered with the mechanical coupler.

5. The in-vehicle structure according to claim 1, wherein
a front end of the first high-voltage equipment extends further to a front side of the vehicle in comparison with a front end of the second high-voltage equipment, and
a longitudinal width of the mechanical coupler is shaped to gradually increase from the second high-voltage equipment, and a front edge of the mechanical coupler is inclined to the front of the vehicle from the second high-voltage equipment toward the first high-voltage equipment.

6. The in-vehicle structure according to claim 2, wherein
a front end of the first high-voltage equipment extends further to a front side of the vehicle in comparison with a front end of the second high-voltage equipment, and
a longitudinal width of the mechanical coupler is shaped to gradually increase from the second high-voltage equipment, and a front edge of the mechanical coupler is inclined to the front of the vehicle from the second high-voltage equipment toward the first high-voltage equipment.

7. The in-vehicle structure according to claim 3, wherein
a front end of the first high-voltage equipment extends further to a front side of the vehicle in comparison with a front end of the second high-voltage equipment, and
a longitudinal width of the mechanical coupler is shaped to gradually increase from the second high-voltage equipment, and a front edge of the mechanical coupler is inclined to the front of the vehicle from the second high-voltage equipment toward the first high-voltage equipment.

8. The in-vehicle structure according to claim 1, wherein
one of the first high-voltage equipment and the second high-voltage equipment is elastically supported on the power generator or on the drive system such that an inclination of the one of the first high-voltage equipment and the second high-voltage equipment to the other when the falling load is imposed.

9. The in-vehicle structure according to claim 2, wherein
one of the first high-voltage equipment and the second high-voltage equipment is elastically supported on the power generator or on the drive system such that an inclination of the one of the first high-voltage equipment and the second high-voltage equipment to the other when the falling load is imposed.

10. The in-vehicle structure according to claim 3, wherein
one of the first high-voltage equipment and the second high-voltage equipment is elastically supported on the power generator or on the drive system such that an inclination of the one of the first high-voltage equipment and the second high-voltage equipment to the other when the falling load is imposed.

11. The in-vehicle structure according to claim 5, wherein
one of the first high-voltage equipment and the second high-voltage equipment is elastically supported on the power generator or on the drive system such that an inclination of the one of the first high-voltage equipment and the second high-voltage equipment to the other when the falling load is imposed.

12. The in-vehicle structure according to claim 1, wherein
the mechanical coupler elastically receives one of the first high-voltage equipment and the second high-voltage equipment in response to the one of the first high-voltage equipment and the second high-voltage equipment being inclined to the other of the one of the first high-voltage equipment and the second high-voltage equipment when the falling load is imposed.

13. The in-vehicle structure according to claim 2, wherein
the mechanical coupler elastically receives one of the first high-voltage equipment and the second high-voltage equipment in response to the one of the first high-voltage equipment and the second high-voltage equipment being inclined to the other of the one of the first high-voltage equipment and the second high-voltage equipment when the falling load is imposed.

14. The in-vehicle structure according to claim 3, wherein
the mechanical coupler elastically receives one of the first high-voltage equipment and the second high-voltage equipment in response to the one of the first high-voltage equipment and the second high-voltage equipment being inclined to the other of the one of the first high-voltage equipment and the second high-voltage equipment when the falling load is imposed.

15. The in-vehicle structure according to claim 5, wherein
the mechanical coupler elastically receives one of the first high-voltage equipment and the second high-voltage equipment in response to the one of the first high-voltage equipment and the second high-voltage equipment being inclined to the other of the one of the first high-voltage equipment and the second high-voltage equipment when the falling load is imposed.

16. The in-vehicle structure according claim 1, wherein
the mechanical coupler has a U-shaped cross-sectional shape in a longitudinal direction of the vehicle.

17. The in-vehicle structure according to claim 1, wherein
respective heights of upper sides of the first high-voltage equipment and the second high-voltage equipment match each other, and the mechanical coupler couples the upper sides of the first high-voltage equipment and the second high-voltage equipment.

18. The in-vehicle structure according to claim 1, wherein
main faces of the first high-voltage equipment are orthogonal to main faces of the second high-voltage equipment.

19. The in-vehicle structure according to claim 1, wherein
the first high-voltage equipment comprises an AC-to-DC converter, and
the second high-voltage equipment includes a DC/DC converter and an inverter.

* * * * *